United States Patent
Hason et al.

(10) Patent No.: US 8,914,834 B2
(45) Date of Patent: Dec. 16, 2014

(54) SOURCE RATE AND CHANNEL RATE MATCHING FOR SCALABLE VIDEO TRANSMISSION

(75) Inventors: Baruh Hason, Tel Aviv-Yaffo (IL);
Aharon Elmaleh, Makabin-Re'ut (IL);
Gabi Ofir, Rishon Letzion (IL);
Salomon Serfaty, Gaash (IL)

(73) Assignee: Motorola Solutions, Inc., Schaumburg, IL (US)

( * ) Notice: Subject to any disclaimer, the term of this patent is extended or adjusted under 35 U.S.C. 154(b) by 167 days.

(21) Appl. No.: 13/185,069

(22) Filed: Jul. 18, 2011

(65) Prior Publication Data
US 2013/0024902 A1 Jan. 24, 2013

(51) Int. Cl.
*H04N 7/173* (2011.01)
*H04N 21/647* (2011.01)
*H04N 21/845* (2011.01)
*H04N 21/61* (2011.01)

(52) U.S. Cl.
CPC ... *H04N 21/64769* (2013.01); *H04N 21/64738* (2013.01); *H04N 21/8451* (2013.01); *H04N 21/6131* (2013.01)
USPC .................. 725/95; 725/90; 725/93; 725/96; 725/116; 725/117

(58) Field of Classification Search
USPC ............................... 725/86–99, 105, 109–118
See application file for complete search history.

(56) References Cited

U.S. PATENT DOCUMENTS

| 8,421,840 | B2 * | 4/2013 | Eleftheriadis et al. ..... 348/14.08 |
| 2004/0194142 | A1 | 9/2004 | Jiang et al. |
| 2006/0156363 | A1 * | 7/2006 | Wu et al. ........................ 725/113 |
| 2007/0053352 | A1 * | 3/2007 | Corcoran ....................... 370/389 |
| 2009/0064254 | A1 * | 3/2009 | Henocq et al. ................. 725/116 |
| 2010/0161823 | A1 | 6/2010 | Jung et al. |
| 2011/0090958 | A1 * | 4/2011 | Sridhar et al. ............ 375/240.12 |
| 2013/0301609 | A1 * | 11/2013 | Smith et al. .................... 370/331 |

FOREIGN PATENT DOCUMENTS

| EP | 2264954 A1 | 12/2010 |
| WO | 03041413 A1 | 5/2003 |

OTHER PUBLICATIONS

Heiko Schwarz, Overview of the Scalable Video Coding Extension of the H.264/AVC Standard, IEEE Transactions on Circuit and Systems for Video Technology, vol. 17, No. 9. Sep. 2007.*

(Continued)

*Primary Examiner* — Nasser Goodarzi
*Assistant Examiner* — Fred Peng
(74) *Attorney, Agent, or Firm* — Barbara R. Doutre (57) ABSTRACT

A source rate associated with a video bit stream (112) and a channel (140) rate associated with an LTE environment can be identified. The video bit stream (112) can be a Scalable Video Codec (SVC) of an H.264/MPEG4 Advanced Video Coding. The channel (140) rate can be associated with one or more segment bandwidth (142) rates. An enhancement path from an enhancement profile (332) associated with the SVC can be determined. The enhancement profile (332) can include one or more cumulative source rates and an associated enhancement options. The enhancement options can be a frame quantity, frame size, and a frame quality (122, 124, 126). The enhancement path can be a subset of nodes of the enhancement graph (400). The channel (140) rate can be matched to a cumulative source rate to a node within the enhancement path. One or more Network Abstraction Layer (NAL) units (144) with the appropriate enhancement values can be conveyed.

19 Claims, 5 Drawing Sheets

(56) References Cited

OTHER PUBLICATIONS

Wikipedia, http://en.wikipedia.org/wiki/Scalable_Video_Coding; Jul. 2007; The SVC project received final approval as video industry standard.*

International Search Report and Written Opinion for International Patent Application No. PCT/US2012/047009 mailed Dec. 20, 2012.
Cohen, R., et al., "Streaming Fine-Grained Scalable Video Over Packet-Based Networks," Globecomm'00 2000, IEEE Global Telecommunications Conference, vol. 1, Nov. 27, 2000, pp. 288-292.

* cited by examiner

$$I_j = \max\left\{k, I_{j-1} < k \leq K; \sum_{i=1}^{k} R_i(n) \leq \sum_{m=1}^{j} G_m \right\} \quad I_0 = 0; j = \{1, 2, \ldots, N\}$$

520

$$P(n) = \frac{\sum_{m=1}^{j-1} G_m - \sum_{i=1}^{I_{j-1}} R_i(n)}{R_{I_{j-1}+1}(n)} \quad 522$$

530

$$I_j = \max\left\{k, I_{j-1} < k \leq K; \sum_{i=I_{j-1}+1}^{k} R_i(n) \leq G_j \right\} \quad I_0 = 0; j = \{1, 2, \ldots, N\}$$

540

$$P(n) = \frac{G_j - \sum_{i=I_{j-1}+1}^{I_j} R_i(n)}{R_{I_j+1}(n)} \quad 542$$

FIG. 5

SOURCE RATE AND CHANNEL RATE MATCHING FOR SCALABLE VIDEO TRANSMISSION

FIELD OF THE INVENTION

The present invention relates to the field of video content delivery and, more particularly, to source rate and channel rate matching for scalable video transmission.

BACKGROUND

Today, video can be used in increasingly diverse applications with a correspondingly diverse set of client devices, from computers viewing Internet video to mobile phones with mobile television capabilities. The video streams for these devices can vary substantially. To address these requirements, video delivery within Long Term Evolution (LTE) networks often relies on efficient video formats which maximize available bandwidth and appropriately targets the client device. One codec which offers many advantages over traditional encodings is Scalable Video Codec (SVC), an extension of the H.264/MPEG4 Advanced Video Coding.

Conventional approaches to transmit compressed video utilize the available channel rate as the independent entry and impose the source rate by configuring the video compression parameters like frame size, frame rate, constant bitrate, quality factor, etc. This approach can only be implemented if the entity sensing the channel rate can access the compressor parameters. In addition, when direct control is possible the compression can be restarted each time a relevant compression parameter is readjusted. Alternatively, multiple compressors can be operated simultaneously for complying preset channel rates. This alternative necessitates the use of multiple compression equipment, one for each preset rate. In the alternative, the switching between the outputs of different compressors (as a result of channel rate change), necessitates control signaling analogous to the resetting of the compression parameters of a single compressors.

An improved version of this alternative generates fixed duration source streams in multiple versions (each version corresponding to a preset channel rate) such that at the end of the fixed duration (e.g., two seconds) the proper stream can be conveyed to the channel. In this improved version of the alternative, each source bit stream representing a fixed duration of video can have its own starting and ending control signaling. This control signaling consumes a portion of amount of channel resource which is often scarce. This improved alternative also necessitates the use of multiple compressors.

SUMMARY

One embodiment of the disclosure includes a method for mutual source and channel rate matching for video transmission. A source rate associated with a video bit stream and a channel rate associated with an LTE environment can be identified. The video bit stream can be a Scalable Video Codec (SVC) of an H.264/MPEG4 Advanced Video Coding. The channel rate can be associated with one or more segment bandwidth rates. An enhancement path from an enhancement profile associated with the SVC can be determined. The enhancement profile can include one or more cumulative source rates and associated enhancement options. The enhancement options can be a frame rate, frame size, and a frame quality. The enhancement path can be a subset of nodes of the enhancement graph. The channel rate can be matched to a cumulative source rate to a node within the enhancement path. One or more Network Abstraction Layer (NAL) units with the appropriate enhancement values can be conveyed.

One embodiment of the disclosure includes a system for a rate matching node of a long term evolution (LTE) of a mobile telecommunication system. A transmission manager within the rate matching node can match the source rate of a video bit stream with a channel rate of a long term evolution (LTE) complaint network. The channel rate can be a cumulative rate of channel segments. The video bit stream can be a Scalable Video Coding (SVC) of an H.264/MPEG4 Advanced Video Coding. The manager can transmit at the channel rate Network Abstraction Layer (NAL) units with enhancement values based on a node within an enhancement profile. The rate matching node can be associated with any node (e.g., gateway, proxy, etc) along the transmission path from the SVC video compressor to the final destination. A computer program instruction can be digitally encoded in at least one storage medium. The computer program instructions can be configured to determine the channel rate of the channel segments and calculate the probability the channel segment is able to successfully overload.

DETAILED DESCRIPTION

In the disclosure, Scalable Video Coding (SVC) as described in H.264 standard Annex G can be utilized. Characteristics of the output bit-stream of the compressed video can be manipulated ensuring that the source rate can be deterministically matched to the available channel rate. An SVC encoded bit stream can be defined including layering in time, frame size, and quality (if required). Each possible hierarchical ordering of the enhancement layers can be mapped to an enhancement profile. For each node in the enhancement profile, the source rate necessary to transmit the bit stream representing the video at the frame size (combinations) and frame rate can be estimated. When the available channel rate is determined, network abstraction layer (NAL) units corresponding from the initial node to the node correlating to the source rate which can be less than or equal to the available channel rate can be conveyed.

When all the conveyed NAL units arrive at the intended destination, the received bit stream can be decoded. Received frames, at any size enhancement level (small size or full size) can be rendered at the full size. Un-received frames (missing time enhancement layer) can be complimented by any time interpolation method. The source rate to channel rate matching principles can be applied at any transmission node in the communication path, with the reservation that the available bit stream can miss enhancement layers beyond a certain level due to "peeling" which occurred at a previous transmission node.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
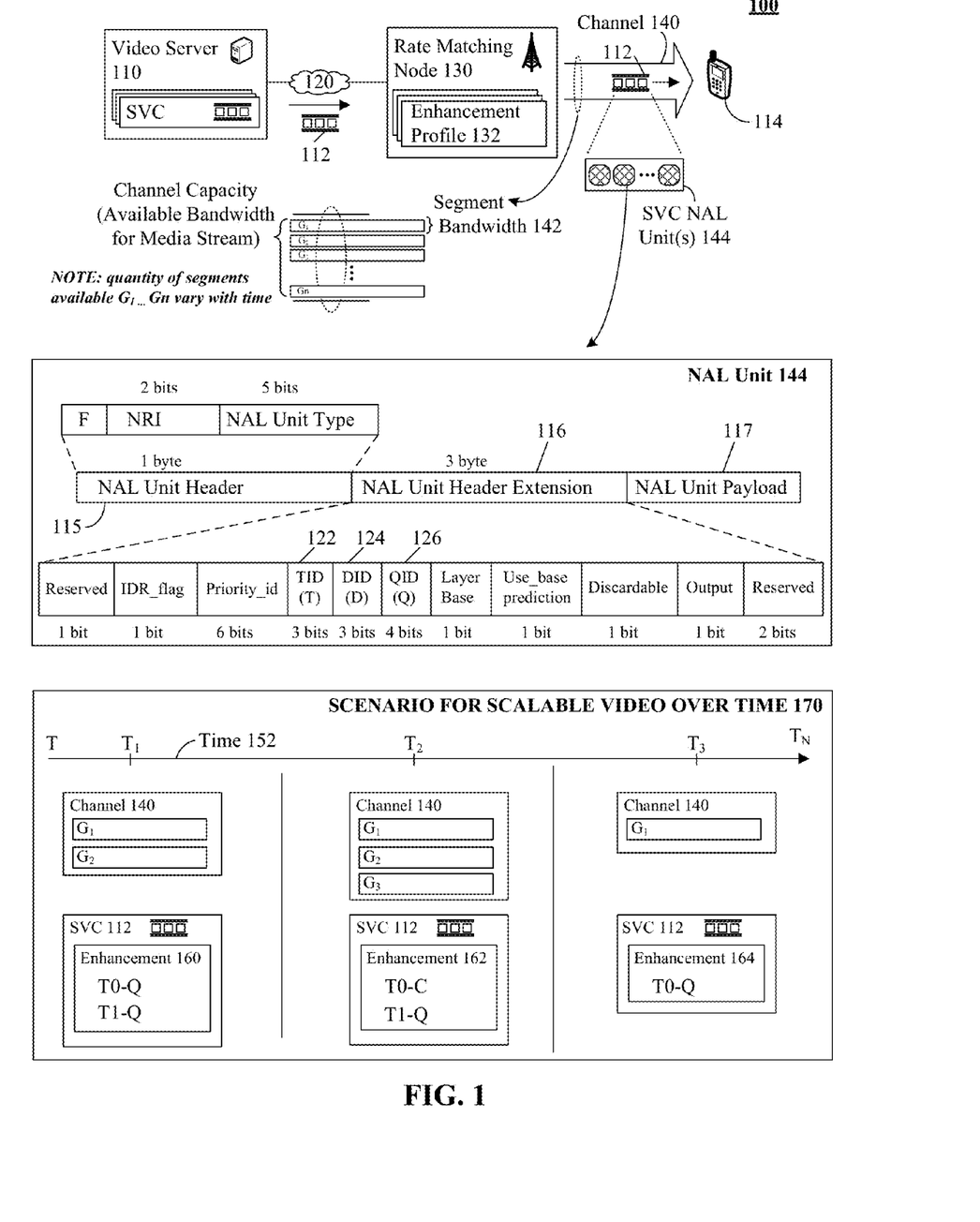
FIG. 1 is a block diagram illustrating a system for source rate and channel rate matching for scalable video transmission in accordance with an embodiment of the inventive arrangements disclosed herein.

FIG. 1 is a block diagram illustrating a system 100 for source rate and channel rate matching for scalable video transmission in accordance with an embodiment of the inventive arrangements disclosed herein. In system 100, a video bit stream 112 (e.g., SVC) can be conveyed to a mobile computing device 114 over network 120 and channel 140 in real-time or near real-time. The video bit stream 112 can be presented upon device 114 in a traditional manner. Channel 140 can be a portion of a wireless communication network such as a Long Term Evolution (LTE) network or a LTE Advanced network or any other wireless or wire-line network. Video server 110 can communicate with rate matching node 130 to convey Scalable Video Coding (SVC) to device 114. The rate matching node 130 can utilize enhancement profile 132 to adapt video fidelity to match the available channel 140 bandwidth. Channel 140 bandwidth can be a cumulative rate of segment bandwidth 142 (e.g., $G_1 \ldots G_n$). As segment bandwidth 142 is gained or lost, SVC fidelity can be increased or decreased appropriately.

Figure 4:
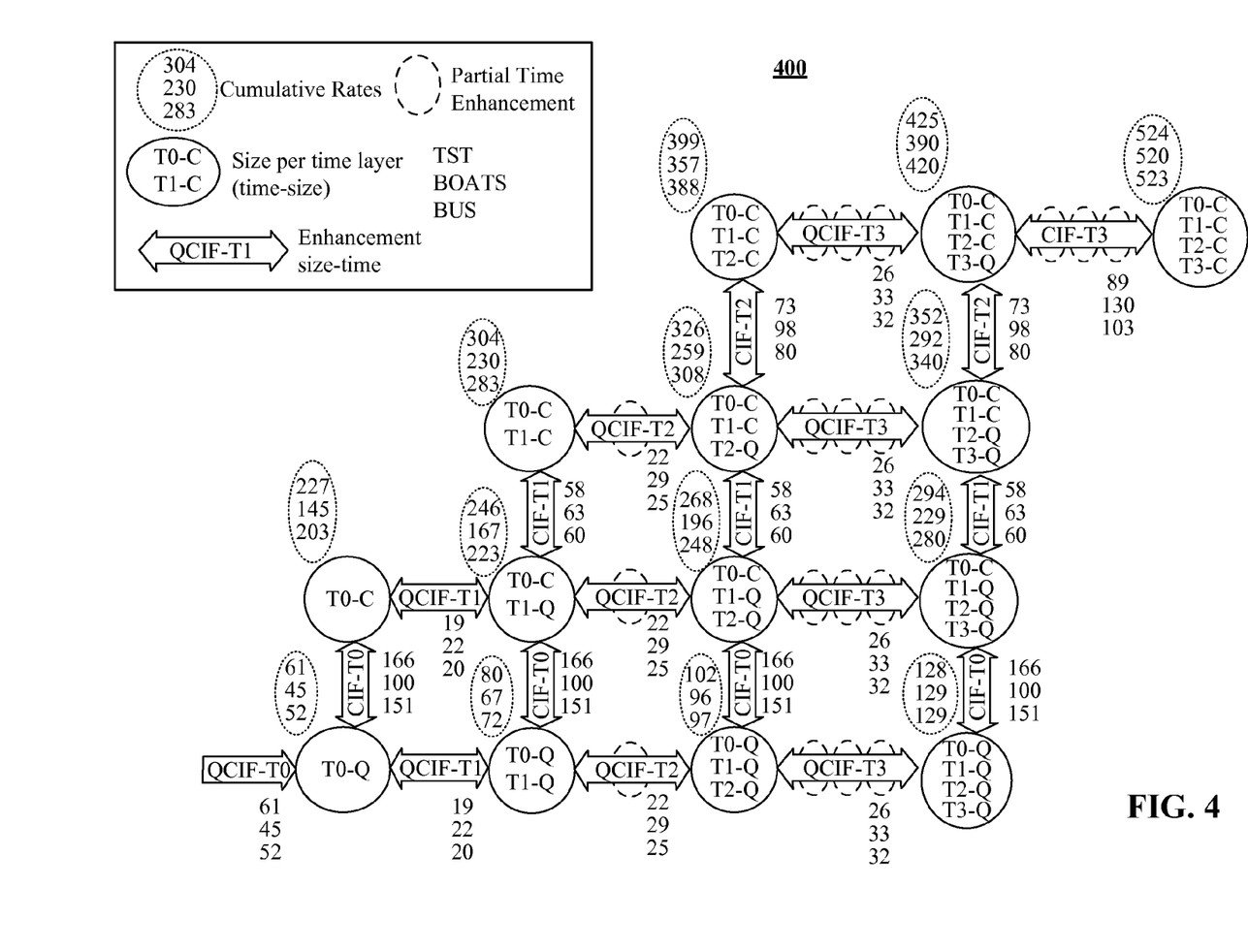
FIG. 4 is a schematic diagram illustrating an enhancement graph for source rate and channel rate matching for scalable video transmission in accordance with an embodiment of the inventive arrangements disclosed herein.

As used herein, SVC can conform to a H.264/MPEG4 Advanced Video Coding extension. SVC can be communicated to device 114 via SVC Network Abstraction Layer (NAL) units 144. NAL units 114 can conform to SVC specification which can include NAL Unit Header 115, NAL Unit Header Extension 116, and NAL Unit Payload 117. Extension 116 can include enhancement values 122-126 which can adjust SVC frame time rate, frame size, and visual quality. Extension 116 can be customized based on enhancement profile 132. Profile 132 can be a directed graph including a source rate and enhancement options (e.g., graph 400). Based on available channel 140 bandwidth, a path can be traversed allowing for increased or decreased fidelity. For example, a profile 132 can include a path starting at the lowest fidelity (e.g., T0-Q) to an enhanced fidelity (e.g., T0-C, T1-C) via traversing a node right (e.g., T0-Q, T1-Q) and a node up (e.g., T0-C, T0-Q). That is, each node can be associated with enhancement options for SVC layers. Different profiles 132 will specify different paths of the video enhancement graph, thereby providing a highly customized solution for delivering scalable video in accordance with a sequence of quality improvement (or degradation) stages, each enhancement in the sequence requiring an increasing (or decreasing) quantity of bandwidth.

Channel 140 can be a wireless communication medium for transmitting SVC (e.g., NAL units 144). Channel 140 bandwidth can vary based on available segments and/or segment bandwidth 142. Segment bandwidth 142 can be for dynamic (or static in one embodiment) based on channel configuration, rate matching node 130 configuration, and the like.

In scenario for scalable video over time 170, a time 152 can represent a duration for which SVC can be communicated to device 114. That is, time 152 can correspond to a SVC streaming operation. Time 152 can include three periods $T_1, T_2, T_3$ which can correlate to changes in channel 140 bandwidth. At each period $T_1$-$T_3$, channel 140 bandwidth can be evaluated and SVC fidelity can be adjusted (e.g., enhancement 160-164) based on enhancement profile 132 to match available bandwidth of channel 140. It should be appreciated that scenario 170 is presented for illustrative purposes only and should not be construed to limit the invention in any regard.

At time $T_1$, channel 140 bandwidth can be detected to include two segments $G_1, G_2$. Enhancement profile 132 can be analyzed to determine an appropriate source rate to match the available channel 140 rate. For example, when channel 140 rate is equivalent to eighty kilobytes per second, the enhancement 160 can double the frame rate of video (corresponding to node T0-Q, T1-Q of graph 400). At time $T_2$, an additional segment can be allocated (e.g., $G_3$) increasing bandwidth of channel 140. Enhancement 162 can be determined to be the next available enhancement based on profile 132. For example, the video visual quality can be improved for a frame (e.g., T0-C, T1-Q node of graph 400). At time $T_3$, channel 140 can lose segments (e.g., $G_2, G_3$), decreasing bandwidth available for video transmission. Utilizing profile 132, an appropriate enhancement can be determined without necessitating computation. For example, when channel bandwidth is equivalent to 61 kilobytes per second, node T0-Q can be matched to indicate video enhancement.

Figure 5:
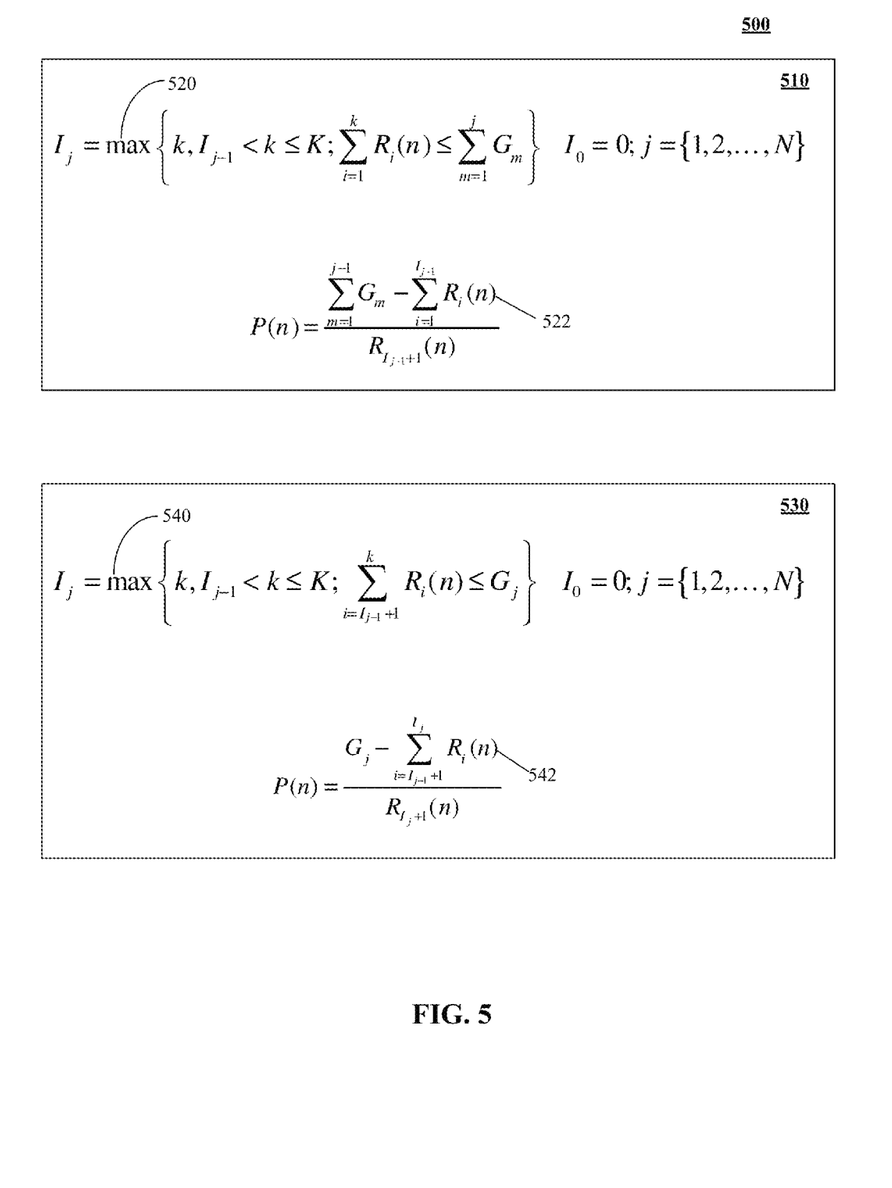
FIG. 5 is a schematic diagram illustrating a set of equations for overloading channel segments for video transmission in accordance with an embodiment of the inventive arrangements disclosed herein.

In one embodiment, channel 140 can be successfully overloaded allowing further enhancements to be applied to SVC. In the embodiment, an overload probability algorithm can be selected and executed to determine the likelihood the channel can be overloaded successfully. For example, algorithms 510 can be executed to create a mapping which can overload channel 140.

Figure 2:
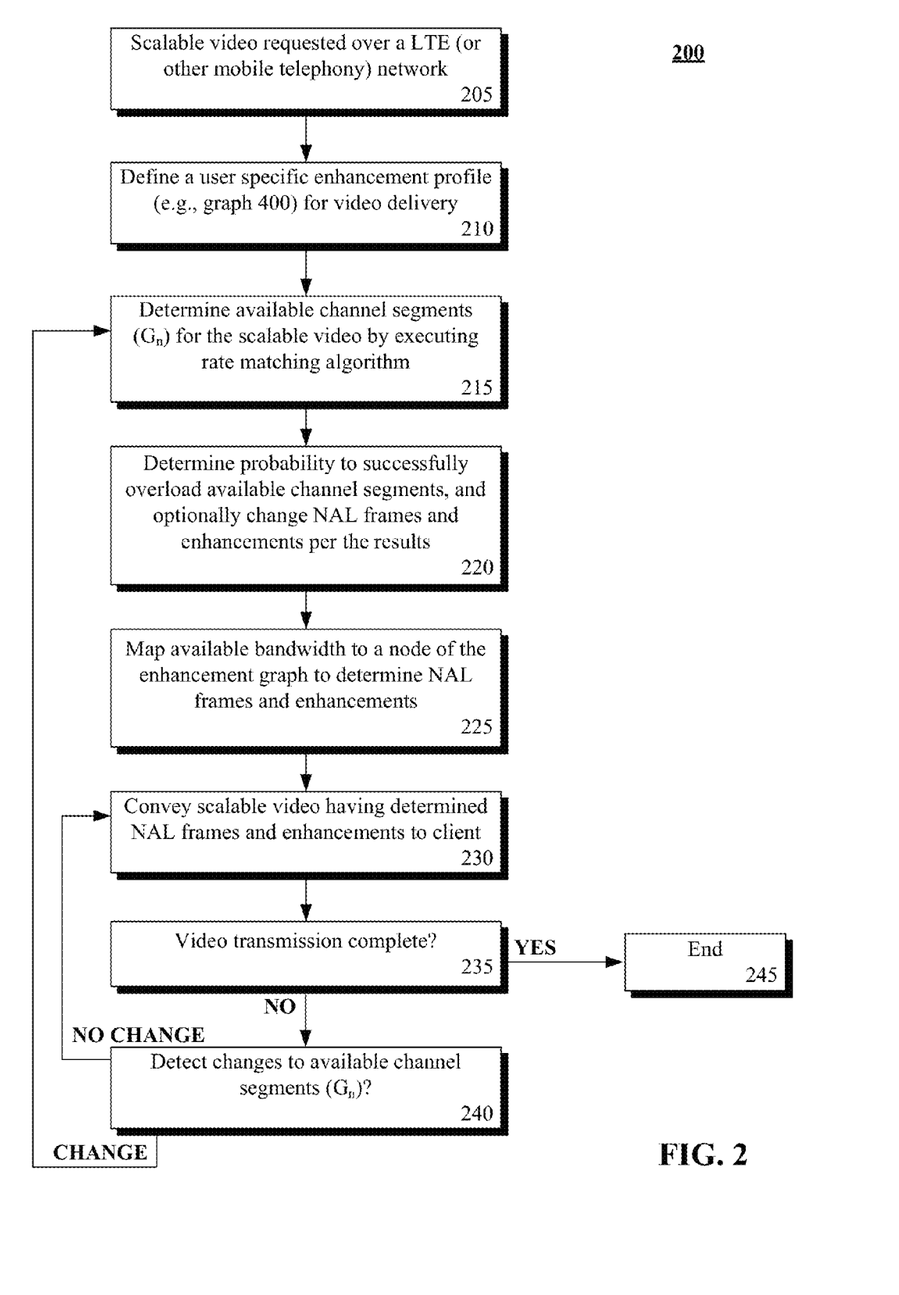
FIG. 2 shows a process for source rate and channel rate matching for scalable video transmission in accordance with an embodiment of the inventive arrangements disclosed herein.

FIG. 2 shows a process 200 for source rate and optimal quality matching for scalable video transmission in accordance with an embodiment of the inventive arrangements disclosed herein. The flow chart 200 can represent on flow for adjusting video transmission enhancement dynamically utilizing an enhancement profile. Scope of the disclosure is not to be limited in to details expressed in flow chart 200, as flow chart 200 is provided for illustrative purposes to show of one contemplated implementation.

In step 205, a scalable video can be requested over an LTE (or other mobile telephony) network by a client device. In step 210, a user specific enhancement profile (e.g., enhancement graph) can be defined for video delivery. In step 215, available channel segments (e.g., $G_n$) for the scalable video can be determined by executing a rate matching algorithm. The rate matching algorithm can be a traditional and/or proprietary algorithm for estimating channel capacity in real-time or near real-time. In step 220, the probability to successfully overload available channel segments can be determined. Based on the probability for a successful overload, NAL frames and enhancements can be optionally changed per the result. That is, when segment overload is likely to succeed the scalable video fidelity can be improved accordingly based on user specific enhancement profile and when segment overload is unlikely to succeed the scalable video fidelity can be decreased stepwise.

In step 225, the available bandwidth can be mapped to a node of the enhancement graph to determine NAL frames and enhancements. In step 230, the scalable video can be conveyed to the client having the determined NAL frames and enhancement. In step 235, if the video transmission is complete, the method can proceed to step 245, else continue to step 240. In step 240, if changes to available channel segments are detected, the method can return to step 215, else continue to step 230. Further, when the channel rate exceeds the source rate by a threshold value, a channel segment is relinquished.

Figure 3:
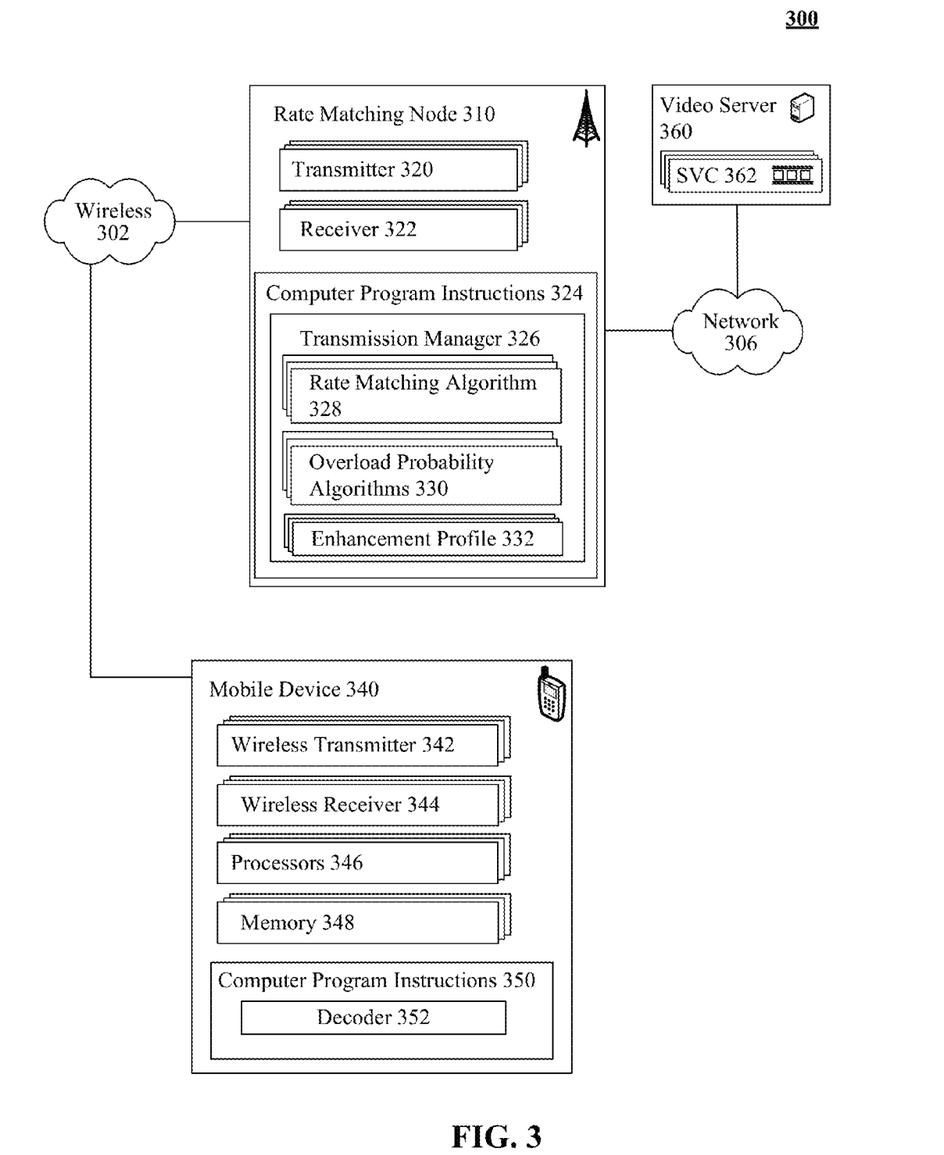
FIG. 3 is a schematic diagram illustrating system for source rate and channel rate matching for scalable video transmission in accordance with an embodiment of the inventive arrangements disclosed herein.

FIG. 3 is a schematic diagram illustrating a system 300 for source rate and optimal quality matching for scalable video transmission in accordance with an embodiment of the inventive arrangements disclosed herein.

The rate matching node 310 can include a set of equipment that facilitates wireless communication (over wireless or wire-line network 302) between user equipment (UE) (e.g., mobile device 340) and a network 306. In various embodiments, the rate matching node 310 can be a functionality of a gateway node, a proxy, a router, and the like.

The rate matching node 310 can include one or more transmitters 320 and one or more receivers 322. Each transmitter 320 can transmit information from the rate matching node 310 to the wireless (or wire-line) network 302 and/or from the rate matching node to mobile device 340. Each receiver 322 can receive information from network 306 and/or video server 360.

The rate matching node can include a set of computer program instructions 324 that are stored on at least one storage medium and that are able to be executed by one or more processors. The computer program instructions 324 can be implemented within software, firmware, or printed circuitry. Sets of computer program instructions 324 can implement a transmission manager 326. The transmission manager 326 can facilitate video 362 transmission with varying enhancement options based on profile 332.

The transmission manager 326 can perform transmission operations including, but not limited to, flow control, encryption, and the like. Manager 326 can include, but is not limited to, rate matching algorithm 328, overload probability algorithms 330, enhancement profile 332, and the like. In one embodiment, the transmission manager 326 can flag specific NAL units with appropriate enhancements to be transmitted. In the embodiment, NAL units which are not flagged can remain un-transmitted.

Rate matching algorithm 328 can be one or more algorithms for adapting to the channel bandwidth. For example, cumulative source bandwidth can be computed according to the chosen enhancement profile 332 to match to the available channel bandwidth (equal to the available channel capacity segments). Algorithm 328 can include any traditional and/or proprietary algorithms. In one embodiment, algorithm 328 can conform to algorithm 520, 530. In one instance, for a given group of pictures (GOP), when all the NAL units for this GOP are available, they can be reordered according their hierarchical importance, as instructed by the chosen enhancement profile 332 and then mapped to the channel capacity segments without any estimation of the average bit rate of individual NAL layers. In this instance, the reordering can become possible if the NAL units are delayed sufficiently.

Overload probability algorithms 330 can be a set of algorithms for determining the probability a channel and/or segments can be successfully overloaded. In one embodiment, algorithms 330 can conform to algorithm 522, 542. For example, algorithm 522 output can be the probability measure for determining the transmission of a NAL unit.

Enhancement profile 332 can be a directed graph including nodes associated with a source rate and an enhancement option. In one instance, profile 332 can be a three-dimensional directed graph which can be utilized to adjust frame rate, frame size, and visual quality of a video bit stream (e.g., SVC). In one instance, profile 332 can be configured by an administrator to customize how scalable video coding enhancements can affect system 300 (e.g., network load, resource load).

The wireless (or wire-line) network 302 can be used convey digitally encoded information wirelessly between mobile devices in range of the rate matching node 310. In various embodiments, wireless network 302 can conform to a variety of wireless communication technologies, such as Global System for Mobile Communications (GSM), Code division multiple access (CDMA), Wireless local loop (WLL), a wide area network (WAN), WiFi (any of the IEEE 802.11 family of standards), WiMAX (Worldwide Interoperability for Microwave Access), etc. In one embodiment, the wireless network 302 can be 3GPP compliant. In one embodiment, wireless network 302 can include a LTE network.

Network 306 can represent a packet switched network. Network 306 can conform to the internet protocol (IP) set of protocols that include a Transmission Control Protocol (TCP) and the Internet Protocol (IP). Network 306 can be public or private. For example network 306 can represent the public internet, a corporate intranet, a virtual private network (VPN), and the like. Data and/or voice (via a Voice Over IP protocol) can be conveyed over network 306.

Mobile device 340 can be referred to as UE, as it includes at least one of a wireless transmitter 342 and wireless receiver 344, which allows the device 340 to connect to wireless network 302. SVC 362 transmission can occur over wireless network 302 which can be received by device 340. Additional (and optional) receivers and/or transmitters can be included in device 340, which may permit device 340 to directly connect to network 304 in a wired or wireless manner in various embodiments The device 340 can include one or more processor 346 and one or more memory 348 components. The set of one or more processors 346 can execute computer program instructions 350 of the device 340. These instructions 350 can represent logic embedded in semiconductor, firmware embedded instructions, and/or software stored on a storage medium of device 340, such as memory 348. Device 340 can include decoder 352 which can process NAL units and present relevant video.

FIG. 4 is a schematic diagram illustrating an enhancement graph for source rate and rate matching for scalable video transmission in accordance with an embodiment of the inventive arrangements disclosed herein. In graph 400, each node can represent the size and the maximum frame rate for an aggregation of NAL units in a group of pictures (GOP). A node can be referred to as a working point. An edge between two nodes can represent the differential aggregation of NAL units needed for improving or reducing the overall layer characteristics between these working points. In the improvement direction an edge can represent either a size enhancement or a rate enhancement (but not both). In graph 400, a node label can represents time layers and their corresponding sizes which can belong to the aggregation of the NAL units. For example, for a node labeled as T0-C, T1-Q, T2-Q the frame rate is half of the full frame rate (T3 not included in the label) and the frames at the one eight (e.g., ⅛) of the frame rate (corresponding to the time layer T0) are at full size (Common Intermediate Format), the frames at the one forth (e.g., ¼) of the frame rate (corresponding to the time layer T1) are at quarter size (Quarter CIF) and the frames at the one half (e.g., ½) of the frame rate (corresponding to the time layer T2) are at quarter size. An edge label, in the form of size-Tk (e.g., QCIF-T0) can represent whether the added NAL units can provide size or time enhancement.

If the size is QCIF, the enhancement can be in the frame rate towards the time layer represented by Tk and the frame size of the newly added frames can be small. If the size is CIF, the enhancement can be in size at the time layer represented by Tk (the frame rate is not improved). For example, an edge labeled as QCIF-T2 can represent the addition of new frames at QCIF size which appear only starting from one half (e.g., ½) of the frame rate. An edge labeled as CIF-T3 can represent the addition of enhancement NAL units for enhancing the size of the frames at the highest (e.g., Tid=3) time layer.

Assuming that an enhancement layer is encoded into a single slice (single NAL unit), the number of NAL units involved in an enhancement transition can depend on the destination time layer. For Tid zero (T0) and one (T1) there can be only one NAL unit involved. For Tid two (T2) and three (T3), two and four NAL units can provide the full (time rate) enhancement respectively. The numbers positioned near the upper left of each node can be examples of the estimated cumulative source rates for each working point for three different video scenarios.

The number of the transitions (e.g., edges) can be the estimated source rates for single enhancement layers. In graph 400, this can be represented by ellipses between node pathways. These ellipses can be referred to as intermediate working points. For example, when the destination time layer is T2 (Tid=2), there can be one intermediate working point between the working points connected by the appropriate edge. When the destination time layer is T3 (Tid=3), there can be three intermediate working points between the working points connected by the appropriate edge. Different enhancement profiles can be easily established permitting control of fidelity improvement. For example, a profile can be created for prioritizing size enhancement. In another example, a profile can be generated for improving timing enhancement first.

It should be appreciated that graph 400 can be an illustrative example and should not be construed to limit the invention in any regard.

FIG. 5 is a schematic diagram illustrating a set of algorithms 510, 530 for the estimation of the cumulative sources rate to cumulative channel rate matching and for overloading channel segments for video transmission in accordance with an embodiment of the inventive arrangements disclosed herein. Algorithms 510-530 can facilitate layer to channel segment mapping for SVC transmission. Basic video layers can be mapped onto a "bearer" (synonym notion for "channel segment") with the highest survivability. For this, the guaranteed bit rate (GBR) of the highest priority bearer can correspond to the expected highest cumulative rate of the minimal layers (NAL units belonging to the most basic layers). The GBR of the additional bearers should complement to the maximum transmission rate. Their priority may also be adjusted in decreasing survivability order.

In algorithms 510, the initial minimal layers can be mapped onto the bearer with the best priority. The next secondary layers can be mapped to the best available bearer with the next priority. The layers at the next level of importance can be mapped to the next best available bearer until all available bearers are filled. Note that the classification of the bearers can be well defined and fixed. However, the boundaries of the layer classification may be dynamic depending on the statistics of the current scenario. The dynamic behavior of the layer classification can be as follows. There can be K layers and each layer can be labeled in ascending order according to its hierarchy in the chosen policy (enhancement profile). The label of the most basic layer can be one (1), the label of the next enhancement layer can be two (2) and so on. At a given time instance n, $R_i(n)$, the rate of the $i^{th}$ enhancement layer, can be the estimated. The GBR values for the available bearers can be $\{G_1, G_2, \ldots, G_N\}$ (N active bearers and N<K). The maximum label $I_j$ for the layers to be mapped to the bearer $G_j$ is defined by the equation 520. If the bearer j−1 is not fully utilized, it can be overloaded using the probability indicated by algorithm 522.

In equation 540, it is shown an alternative method with the use of which SVC layers can be mapped to surviving bearers. In addition, for the NAL unit with index $I_j+1$ the overloading probability can be computed using algorithm 542.

The flowchart and block diagrams in the FIGS. 1-5 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for video transmission, comprising:
    creating an enhancement profile for video transmission, wherein the enhancement profile is a directed graph comprising of a plurality of nodes, wherein each node is associated with a source rate and enhancement options for a video bit stream, wherein the enhancement options include a frame rate and a frame size, wherein an edge between two nodes represents enhancement in the frame rate or the frame size;
    identifying a source rate associated with the video bit stream and a channel rate associated with wireless communication environment, wherein the video bit stream is a Scalable Video Codec (SVC) of an H.264/MPEG4 Advanced Video Coding, wherein the channel rate is associated with at least one segment bandwidth rate;
    mapping the available channel rate to a node within the enhancement graph to determine Network Abstraction Layer (NAL) units comprising enhancement values based on enhancement options associated with the node, wherein the source rate associated with the node is less than or equal to the available channel rate; and
    transmitting the SVC having the determined NAL units and the enhancement values.

2. The method of claim 1, wherein the enhancement profile is a three dimensional directed graph, wherein the enhancement options include the frame rate, the frame size and a visual quality.

3. The method of claim 1, wherein the frame size of the SVC is at least one full frame size and a reduced frame size.

4. The method of claim 1, further comprising:
    determining the probability to successfully overload available channel segments based on at least one probability algorithm; and
    when the outcome of the algorithm indicates success is likely, modifying NAL unit frames and enhancement values based on enhancement options of a node of the enhancement profile.

5. The method of claim 1, further comprising:
    marking the NAL unit associated with the SVC with a Boolean value to indicate the NAL unit is to be transmitted or not transmitted.

6. The method of claim 1, further comprising:
    relinquishing a channel segment when the channel rate exceeds the source rate by a threshold value.

7. The method of claim 1, further comprising:
    detecting a change in the channel rate resulting in a different channel rate; and
    matching the different channel rate to a node within the enhancement profile.

8. A system for scalable video coding transmission, comprising:
    a rate matching node to facilitate communication between a user equipment (UE) and a wireless communication network, wherein the rate matching node comprises:
        at least one transmitter to transmit information from the rate matching node;
        at least one receiver to receive information from a video server;
        a processing unit executing computer program instructions to:
            create an enhancement profile associated with scalable video coding transmission, wherein the enhancement profile is a directed graph comprising of a plurality of nodes, wherein each node is associated with a source rate and enhancement options for a video bit stream, wherein the enhancement options include a frame rate and a frame size, wherein an edge between two nodes represents enhancement in the frame rate or the frame size;
            identify a source rate associated with the video bit stream and a channel rate associated with wireless communication environment, wherein the video bit stream is a Scalable Video Codec (SVC) of an H.264/MPEG4 Advanced Video Coding, wherein the channel rate is associated with at least one segment bandwidth rate;
            match the source rate to a node within the enhancement graph to determine Network Abstraction Layer (NAL) units comprising enhancement values based on enhancement options associated with the node, wherein the source rate associated with the node is less than or equal to the available channel rate; and transmit, via the transmitter, the SVC having the determined NAL units and the enhancement values.

9. The system of claim 8, wherein the enhancement profile is a three dimensional directed graph comprising of nodes associated with the source rate and the plurality of enhancement options.

10. The system of claim 8, wherein the enhancement values are at least one of the frame rate, the frame size and a visual quality.

11. The system of claim 8, wherein the processing unit relinquishes a channel segment when the channel rate exceeds the source rate by a threshold value.

12. The system of claim 8, wherein the processing unit performs a stepwise quality adjustment to the video bit stream based on the enhancement profile.

13. The system of claim 8, wherein the enhancement profile is generated based on the hierarchical ordering of enhancement layers associated with the SVC.

14. The system of claim 13, wherein the processing unit defines an intermediate working point between two nodes of the enhancement profile.

15. The system of claim 8, wherein the processing unit is further operative to:
    determine the probability to successfully overload available channel segments based on at least one probability algorithm; and
    modify NAL unit frames and enhancement values based on enhancement options of a node of the enhancement profile, when the outcome of the algorithm indicates success is likely.

16. The system of claim 8, wherein the at least one processing unit executing computer program instructions is further operative to:
    detect a change in the channel rate resulting in a different channel rate; and
    match the different channel rate to a node within the enhancement profile.

17. A computer program product comprising a non-transitory computer readable storage medium having computer usable program code embodied therewith, the computer usable program code comprising:
    computer usable program code stored in a non-transitory storage medium, computer usable program code is executed by a processor to create an enhancement profile associated with video transmission, wherein the enhancement profile is a directed graph comprising of a plurality of nodes, wherein each node is associated with a source rate and enhancement options for a video bit stream, wherein the enhancement options include a frame rate and a frame size, wherein an edge between two nodes represents enhancement in the frame rate or the frame size;
    computer usable program code stored in a non-transitory storage medium, computer usable program code is executed by a processor to identify a source rate associated with the video bit stream and a channel rate associated with a wireless communication environment, wherein the video bit stream is a Scalable Video Codec (SVC) of an H.264/MPEG4 Advanced Video Coding, wherein the channel rate is associated with at least one segment bandwidth rate;
    computer usable program code stored in a non-transitory storage medium, computer usable program code is executed by a processor to map the channel rate to a node within the enhancement graph to determine a plurality of Network Abstraction Layer (NAL) units comprising enhancement values based on enhancement options associated with the node, wherein the source rate associated with the node is less than or equal to the available channel rate; and
    computer usable program code stored in a non-transitory storage medium, computer usable program code is executed by a processor to convey the SVC having the determined NAL units and the enhancement values.

18. The computer program product of claim 17, further comprising:
    computer usable program code stored in a non-transitory storage medium, computer usable program code is executed by a processor to determine the probability to successfully overload available channel segments based on at least one probability algorithm; and
    computer usable program code stored in a non-transitory storage medium, computer usable program code is executed by a processor to modify NAL unit frames and enhancement values based on enhancement options of a node of the enhancement profile, when the outcome of the algorithm indicates success is likely.

19. The computer program product of claim 17, further comprising:
    computer usable program code stored in a non-transitory storage medium, computer usable program code is executed by a processor to detect a change in the channel rate resulting in a different channel rate; and
    computer usable program code stored in a non-transitory storage medium, computer usable program code is executed by a processor to match the different channel rate to a node within the enhancement profile.

* * * * *

UNITED STATES PATENT AND TRADEMARK OFFICE
CERTIFICATE OF CORRECTION

PATENT NO. : 8,914,834 B2
APPLICATION NO. : 13/185069
DATED : December 16, 2014
INVENTOR(S) : Baruh Hason et al.

Page 1 of 1

It is certified that error appears in the above-identified patent and that said Letters Patent is hereby corrected as shown below:

ON THE TITLE PAGE:

Item 75, under "Inventors," in Column 1, Line 1, delete "Tel Aviv-Yaffo" and insert -- Tel Aviv-Yafo --, therefor.

Item 75, under "Inventors," in Column 1, Line 2, delete "Makabin-Re'ut" and insert -- Maccabim-Re'ut --, therefor.

Item 75, under "Inventors," in Column 1, Line 3, delete "Rishon Letzion" and insert -- Rishon Lezion --, therefor.

Item 75, under "Inventors," in Column 1, Line 4, delete "Gaash" and insert -- Ga'ash --, therefor

IN THE SPECIFICATION:

In Column 4, Line 61, delete "units 114" and insert -- units 144 --, therefor.

In Column 5, Line 64, delete "show of one" and insert -- show one of --, therefor.

In Column 7, Line 2, delete "algorithm 520," and insert -- algorithms 510, --, therefor.

In Column 7, Line 53, delete "embodiments" and insert -- embodiments. --, therefor.

Signed and Sealed this
Twenty-eighth Day of June, 2016

Michelle K. Lee
*Director of the United States Patent and Trademark Office*